United States Patent
Itoh et al.

(10) Patent No.: US 10,223,625 B2
(45) Date of Patent: Mar. 5, 2019

(54) TWO-DIMENSIONAL CODE GENERATION DEVICE AND TWO-DIMENSIONAL CODE GENERATION PROGRAM PRODUCT

(71) Applicant: DENSO CORPORATION, Kariya, Aichi-pref. (JP)

(72) Inventors: Masatoshi Itoh, Kariya (JP); Yousuke Kimura, Kariya (JP); Hiroki Ukai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/122,839

(22) PCT Filed: Mar. 9, 2015

(86) PCT No.: PCT/JP2015/001273
§ 371 (c)(1),
(2) Date: Aug. 31, 2016

(87) PCT Pub. No.: WO2015/146020
PCT Pub. Date: Oct. 1, 2015

(65) Prior Publication Data
US 2017/0068880 A1 Mar. 9, 2017

(30) Foreign Application Priority Data
Mar. 24, 2014 (JP) .................. 2014-060071

(51) Int. Cl.
*G06K 1/12* (2006.01)
*G06K 19/06* (2006.01)
*H04N 1/387* (2006.01)

(52) U.S. Cl.
CPC ....... *G06K 19/06103* (2013.01); *G06K 1/121* (2013.01); *G06K 19/06037* (2013.01); *H04N 1/3871* (2013.01)

(58) Field of Classification Search
USPC ......................................................... 235/494
See application file for complete search history.

(56) References Cited

U.S. PATENT DOCUMENTS 7,152,805 B2 * 12/2006 Walmsley et al. ............ 235/494
8,144,922 B2 * 3/2012 Kawabe ........... G06K 19/06037
235/462.04
2009/0242649 A1 10/2009 Mizukoshi et al.

FOREIGN PATENT DOCUMENTS

JP 2002108672 A 4/2002
JP 2005341369 A 12/2005
(Continued)

OTHER PUBLICATIONS

Yu-Hsun Lin et al., "Appearance-Based QR Code Beautifier", IEEE Transactions on Multimedia IEEE, Jul. 3, 2013, vol. 15, No. 8, pp. 2198-2207.
(Continued)

Primary Examiner — Rafferty Kelly
(74) Attorney, Agent, or Firm — Harness, Dickey & Pierce, P.L.C.

(57) ABSTRACT

A two-dimensional code generation device includes a determination unit, an image acquisition unit, and a code generation unit. The determination unit determines whether point information is included in coding information, which is information for generating a two-dimensional code. The image acquisition unit selecting, from an image database in which multiple images are registered, an image that visually indicates the point information as a base image and acquires the selected image as the base image when the determination unit determines that the point information is included in the coding information. The code generation unit generates the two-dimensional code based on the coding information, and
(Continued)

includes the base image in the two-dimensional code in a superimposed manner when the base image is acquired by the image acquisition unit.

9 Claims, 6 Drawing Sheets

(56) References Cited

FOREIGN PATENT DOCUMENTS

| | | |
|---|---|---|
| JP | 2006202264 A | 8/2006 |
| JP | 2009160088 A | 7/2009 |
| JP | 2009230729 A | 10/2009 |
| JP | 2009259192 A | 11/2009 |
| JP | 2011059069 A | 3/2011 |
| JP | 2011237552 A | 11/2011 |

OTHER PUBLICATIONS

Fujita et al., "A Study of Image Displayable Design QR Code", IEICE technical report, IEICE, Jan. 13, 2011, vol. 110, No. 374, pp. 39-44.

* cited by examiner

EXAMPLE IN WHICH POINT INFORMATION IS INCLUDED IN CODING INFORMATION

FIG. 4B

EXAMPLE IN WHICH PIN IMAGE IS LINKED TO POINT INFORMATION

FIG. 5A

EXAMPLE IN WHICH "RESTRAINT" OR THE LIKE IS INCLUDED IN POI INFORMATION

FIG. 5B

EXAMPLE IN WHICH "HOTEL" OR THE LIKE IS INCLUDED IN POI INFORMATION

FIG. 6A
EXAMPLE SHOWING DAYTIME EVENT

FIG. 6B
EXAMPLE SHOWING NIGHT-TIME EVENT

TWO-DIMENSIONAL CODE GENERATION DEVICE AND TWO-DIMENSIONAL CODE GENERATION PROGRAM PRODUCT

CROSS REFERENCE TO RELATED APPLICATIONS

This application is a U.S. National Phase Application under 35 U.S.C. 371 of International Application No. PCT/JP2015/001273 filed on Mar. 9, 2015 and published in Japanese as WO2015/146020A1 on Oct. 1, 2015. This application is based on and claims the benefit of priority from Japanese Patent Application No. 2014-060071 filed on Mar. 24, 2014. The entire disclosures of all of the above applications are incorporated herein by reference.

TECHNICAL FIELD

The present disclosure relates to a two-dimensional code generation device and a two-dimensional code generation program product each of which generates a two-dimensional code.

BACKGROUND ART

In a QR code (registered trademark) which is one type of two-dimensional codes, generally, patterns of light and dark are displayed, and it is difficult for a user to visually grasp what information is included in the QR code by merely viewing the QR code. For that reason, for example, a caption is presented around the QR code, or a company name is superimposed on the QR code for display. For example, as disclosed in Patent Literature 1, in order to enhance an interest of a user, an image designed in advance is superimposed on the QR code.

For example, suppose that the QR code is used in an information magazine in which event information or leisure information is published. When point information that identify a position of an event venue is provided together with the QR code, it is conceivable that improved services other than simple information provision can be provided. For example, the improved service may include route guidance to a destination which is performed in cooperation with a navigation application.

However, in order to present a caption representing that the point information is included in the QR code, a display space other than a space of the QR code is required, and when a paper surface is limited as with magazines, the display space may be restricted. When the image is superimposed on the QR code as in the above Patent Literature 1, it is necessary to understand what information a creator of the QR code provides, and create an image corresponding to the information.

PRIOR ART LITERATURE

Patent Literature

Patent Literature 1: JP 2009-230729 A

SUMMARY OF INVENTION

In view of the foregoing difficulties, it is an object of the present disclosure to provide a two-dimensional code generation device and a two-dimensional code generation program product each of which generates a two-dimensional code enabling a user to visually grasp that point information is provided by the two-dimensional code.

According to an aspect of the present disclosure, a two-dimensional code generation device includes a determination unit, an image acquisition unit, and a code generation unit. The determination unit determines whether point information is included in coding information. Herein, the coding information is information for generating a two-dimensional code. The image acquisition unit selects, from an image database, an image that visually indicates the point information and acquires the image that is selected as a base image when the determination unit determines that the point information is included in the coding information. In the image database, multiple images are preliminarily registered. The code generation unit generates the two-dimensional code based on the coding information. The code generation unit includes the base image in the two-dimensional code in a superimposed manner when the base image is acquired by the image acquisition unit.

In the above two-dimensional code generation device, the image is selected and acquired on the basis of the point information included in the coding information. Thus, a person who creates the two-dimensional code can acquire a desired image, and has no need to generate the image each time. With the generation of the two-dimensional code on which the acquired image is superimposed, the user can visually grasp that the point information is provided by the two-dimensional code when the user only views the two-dimensional code without scanning and reading the two-dimensional code.

According to another aspect of the present disclosure, a two-dimensional code generation program product stored in a non-transitory tangible computer readable storage medium includes instructions to be executed by a computer included in a controller of a two-dimensional code generation device. The instructions are for implementing: determining whether point information is included in coding information; selecting, from an image database, an image that visually indicates the point information and acquiring the image that is selected as a base image when determining that the point information is included in the coding information; and generating the two-dimensional code in which the base image is included in a superimposed manner based on the coding information. The coding information is information for generating a two-dimensional code. In the image database, multiple images are preliminarily registered.

According to the above two-dimensional code generation program product, the two-dimensional code that enables the user to visually grasp that the point information is provided can be generated.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, an embodiment of the present disclosure will be described with reference to FIGS. 1 to 6B.

Figure 1:
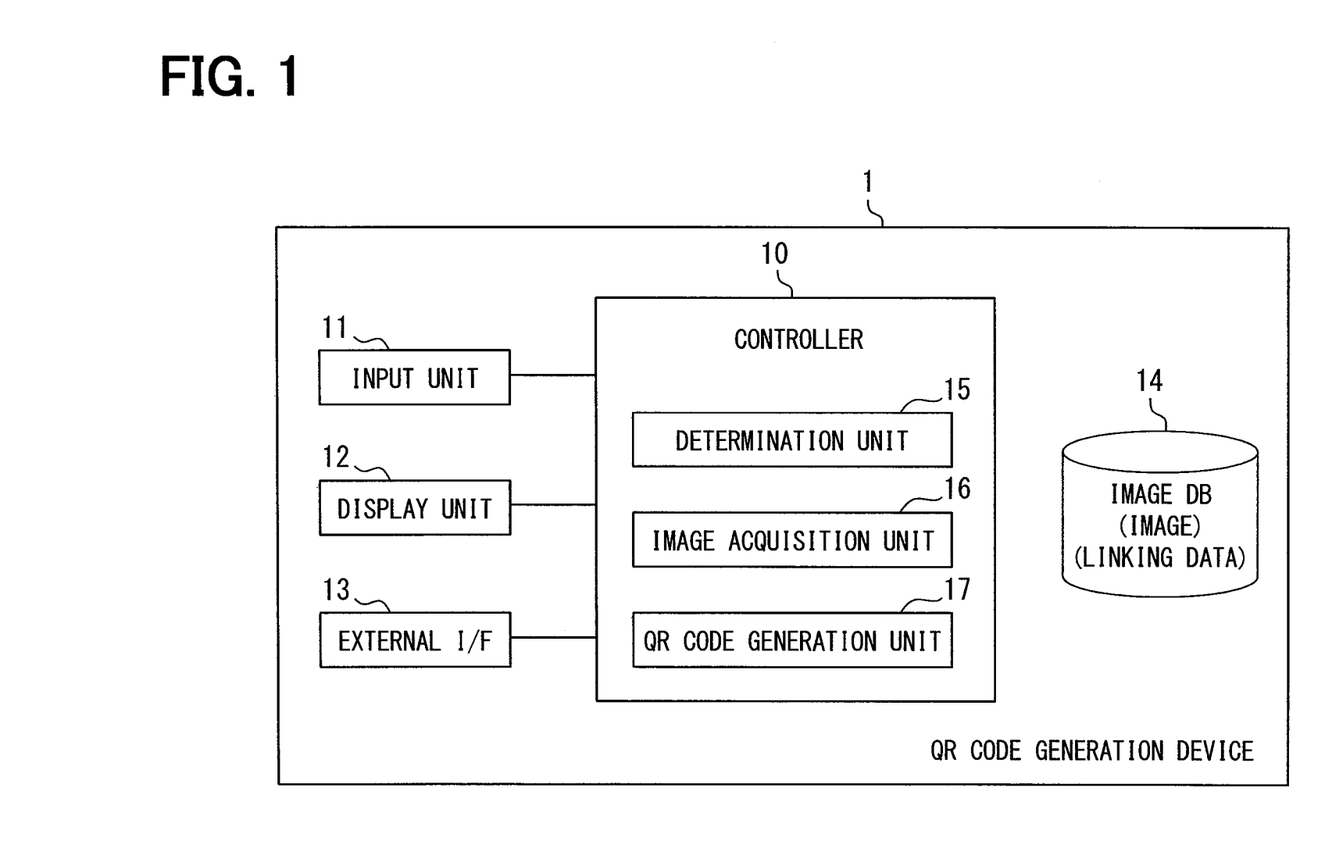
FIG. 1 is a diagram schematically illustrating an electric configuration of a QR code generation device according to an embodiment of the present disclosure.

FIG. 1 shows a QR code generation device 1 as an example of a two-dimensional code generation device according to the present disclosure. The QR code generation device 1 includes a controller 10, an input unit 11, a display unit 12, an external I/F 13, and an image database 14. Hereinafter, the image database 14 is called "image DB 14". The QR code generation device 1 is configured by a personal computer, the controller 10 is configured by a CPU of the personal computer, the input unit 11 is configured by a keyboard or a mouse of the personal computer, and the display unit 12 is configured by a display of the personal computer. In the present embodiment, coding information for generating a QR code is input from the input unit 11, and generated QR code is displayed on the display unit. The external I/F 13 is configured by, for example, a network interface or a memory card interface.

The controller 10 includes a determination unit 15, an image acquisition unit 16, and a code generation unit 17. Although will be described in detail later, the determination unit 15 determines whether point information is included in the coding information. The coding information is information for generating the QR code. When it is determined by the determination unit 15 that the point information is included in the coding information, the image acquisition unit 16 selects, from the image DB 14, an image that visually indicate that the QR code includes the point information, and acquires the selected image as a base image. The code generation unit 17 generates the QR code on the basis of the coding information and superimposes the base image on the QR code when the base image is acquired by the image acquisition unit 16. The determination unit 15, the image acquisition unit 16, and the code generation unit 17 are realized in a software manner by a program to be executed by the controller 10 in the present embodiment.

The image DB 14 is stored in a storage medium such as a hard disk device. Multiple images and linking data, which associate the images with the point information and POI (point of interest) information, are registered in the image DB 14. In this example, the point information represents information used for identifying a point, and the point information is included in the coding information which is inputted for generating the QR code. The point information includes information that enables an identification of a point in direct or indirect manner. For example, the point information may include latitude and longitude, address, zip code, telephone number, or area mesh code (JISX0410). In the present specification, the "point" broadly includes not only a position but also an area in which the position is included.

In addition, the POI information represents information related to a POI, and is included in the coding information. The POI information may include a POI name or a genre to which the POI belongs, such as a restaurant or an accommodation. Hereinafter, the image associated with the point information or the POI information is also called "image linked to the point information" or "image linked to the POI information".

Figure 2:
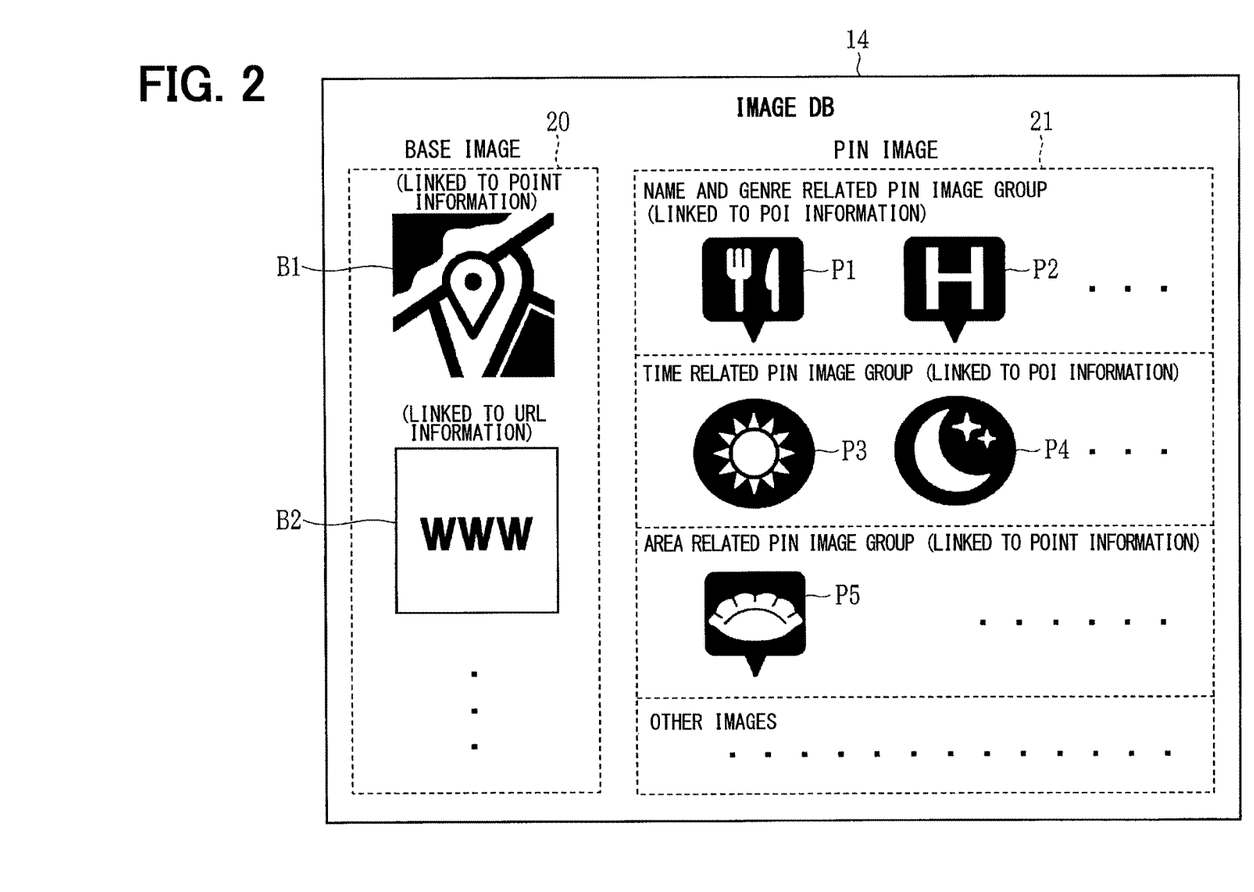
FIG. 2 is a diagram schematically illustrating an example of an image registered in an image DB.

The images registered in the image DB 14 are images that are to be superimposed on the QR code and to be displayed to a user. The images visually indicate what information is provided by the QR code, and enables the user to visually grasp the type of information provided by the QR code. In the present embodiment, as illustrated in FIG. 2, multiple base images linked to the point information or URL (uniform resource locator) information and multiple pin images linked to the POI information are provided as the coding information, and are registered in the image DB 14. Specifically, the image DB 14 includes a base image registration unit 20 in which the multiple base images linked to the point information or linked to the URL information are registered. The image DB 14 further includes a pin image registration unit 21 in which the multiple pin images linked to the POI information are registered. Meanwhile, although the images indicated in FIG. 2 are monochrome images, color images may be used for the base images and pin images in the present embodiment. The images illustrated in FIG. 2 show examples of the embodiment, and are not limited to those examples.

For example, a base image B1 linked to the point information is registered in the base image registration unit. For example, the base image B1 is obtained by simplifying or schematically illustrating a map or a destination mark, and visually indicates the map to the user, or reminds the user to think of a map. For that reason, the user who views the base image B1 can understand that the base image indicates or suggests a map. The QR code on which the base image B1 is superimposed is generated as in a QR code generation process (refer to FIG. 3) to be described later. Thus, a user who views the QR code can visually grasp that the QR code includes the map, that is, the point information. The base image B1 corresponds to an image that visually indicates the point information.

A base image B2 linked to the URL information includes, for example, characters of "WWW", and visually indicates a homepage to the user, or reminds the user to think of a homepage. With the generation of the QR code on which the base image B2 is superimposed, the user who views the QR code can grasp that the homepage or information on a link of the homepage is provided by the QR code.

Pin images P1 and P2 related to POI name and genre are registered in the pin image registration unit. The pin images P1 and P2 are linked to POI name and genre, respectively. The name or genre related pin image corresponds to an image which can visually indicate the genre to which the POI name belongs. For example, the pin image P1 is indicative of an image obtained by schematically illustrating a knife and a fork, and visually indicates an eating place, such as a restaurant, or reminds the user to think of an eating place, such as a restaurant. The pin image P2 includes a character of "H", and visually indicates an accommodation, such as a hotel, or reminds the user to think of an accommodation, such as a hotel.

A time related pin image which is linked to time information corresponds to an image that visually indicates a time identified by the time information. For example, a pin image P3 is obtained by schematically illustrating the sun, and visually indicates daytime or reminds the user to think of daytime. For another example, a pin image P4 is obtained by schematically illustrating the moon and stars, and visually indicates night-time or reminds the user to think of night-time. The time information may be a period of time during which an event is held. For example, when the QR code is displayed on a website, the pin image may be changed according to an access time at which a user visits the site. When the QR code is retrieved from a search site, the pin image may be changed according to a search time.

In addition, an area related pin image, which is linked to the point information, corresponds to an image that visually indicates the point information. More specifically, the area related pin image is an image linked to the area identified on the basis of the point information, and can present the information linked to the point. For example, the point information may include address or zip code. For example, a pin image P5 illustrated in FIG. 2 is an image obtained by schematically illustrating dumplings, and visually indicates that the specialty of that area is dumplings, or reminds the user to think of specialty of that area, such as dumplings. In this case, when it is assumed that the point identified by the point information is, for example, an XX city famous for the dumplings, an image of the dumplings such as the pin image P5 is linked to the XX city. Meanwhile, the classification of the areas is not limited to the administrative division such as prefecture and municipalities, but the areas may be classified by area mesh codes or zip codes. In addition, areas having the same top three digits of mesh codes or zip codes may be regarded as one area.

The QR code generation device 1 generates the QR code that enables the user to visually grasp that the point information is provided as follows, with the use of those images registered in the image DB 14. Meanwhile, since a technique for generating the QR code and a technique for coloring the QR code are well known, a description of those techniques will be omitted. The following process is performed by the determination unit 15, the image acquisition unit 16, or the code generation unit 17. For simplifying the description, the QR code generation device 1 will be mainly described as a subject of the following process.

Figure 3:
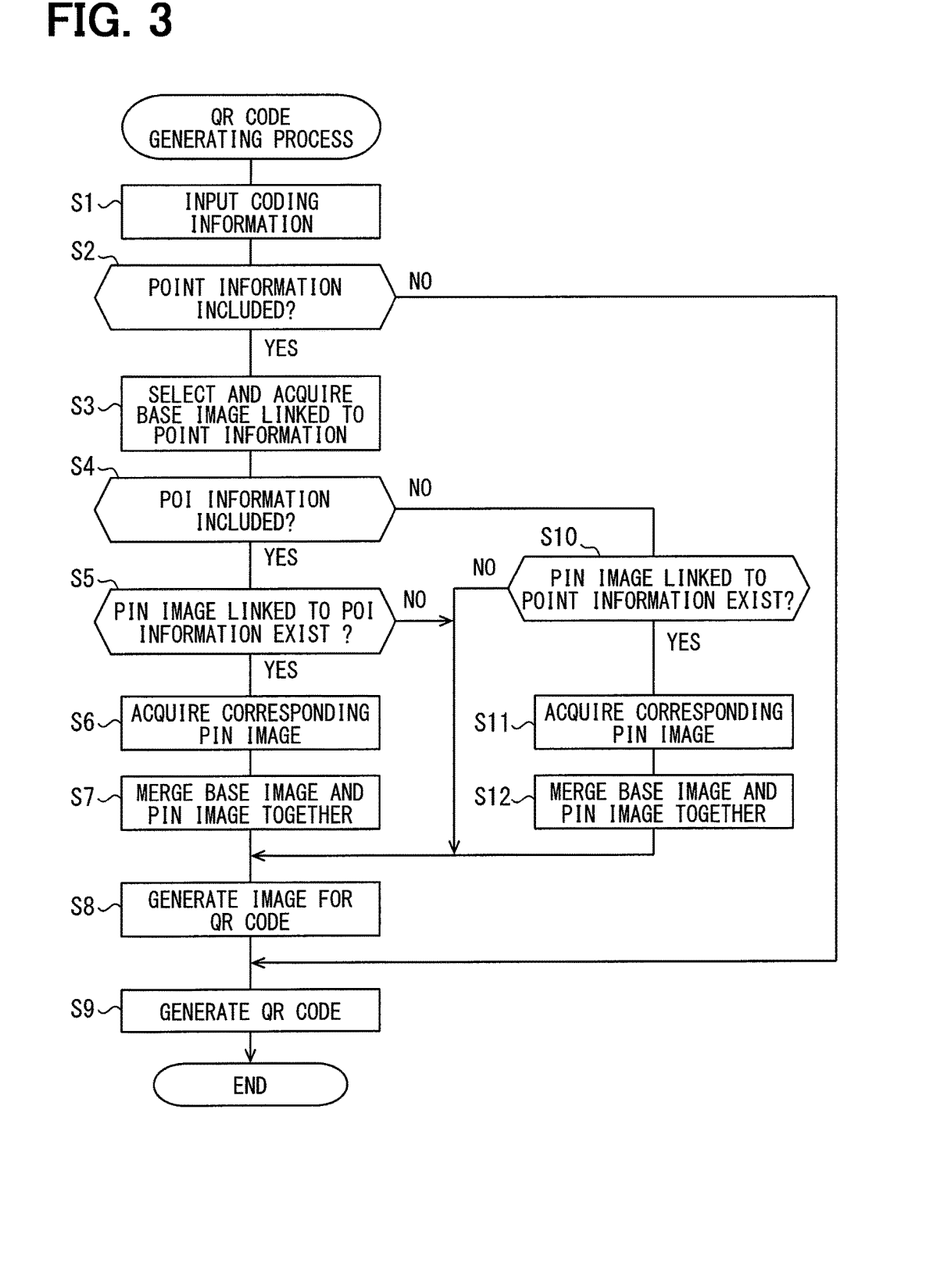
FIG. 3 is a flowchart illustrating a flow of a QR code generating process.

In the QR code generating process illustrated in FIG. 3, when the coding information is inputted (S1), the QR code generation device 1 determines whether the point information is included in the coding information (S2). The determination is performed by the determination unit 15. The process in step S2 corresponds to a determination process.

When the determination unit 15 determines that the point information is not included in the coding information (S2: NO), the QR code generation device 1 generates the QR code on the basis of the coding information (S9). The process in step S9 corresponds to a QR code generation process. In this case, the generated QR code is displayed in a normal pattern of light and dark. This makes it difficult for the user to grasp what information is provided by merely viewing the QR code.

On the contrary, when the determination unit 15 determines that the point information is included in the coding information (S2: YES), the QR code generation device 1 selects and acquires the base image linked to the point information from the multiple images included in the image DB 14 (S3). In the present embodiment, in step S3, the base image B1 (refer to FIG. 2) is selected and acquired as a base image to be superimposed on the QR code. The image is acquired by the image acquisition unit 16. The process in step S3 corresponds to an image acquisition process.

Upon acquiring the base image, the QR code generation device 1 determines whether POI information is included in the coding information (S4). The process in step S4 corresponds to a determination process. When it is determined that the POI information is not included in the coding information (S4: NO), the QR code generation device 1 determines whether the pin image linked to the point information is registered in the image DB 14. In other words, the QR code generation device 1 determines whether the pin image linked to the point information exists in the image DB 14 (S10). The process in step S10 corresponds to a determination process.

When determining that pin image linked to the point information does not exist (S10: NO), the QR code generation device 1 generates an image for QR code, which is a base image for generating the QR code, with the use of the acquired base image (S8). When there is no pin image linked to the point information, the image for QR code which is generated in step S8 is substantially identical with the base image B1. The QR code generation device 1 generates the QR code by superimposing the acquired base image on the QR code pattern (S9). The QR code is generated by the code generation unit 17. The processes in steps S8 and S9 correspond to a QR code generation process.

Figure 4A:
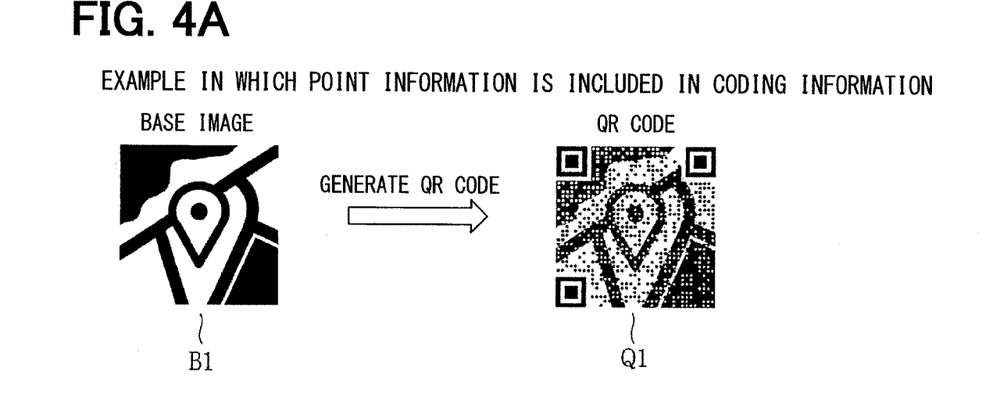
FIG. 4A is a diagram illustrating an example of the QR code on which a base image linked to point information is superimposed.

With the above process, as illustrated in FIG. 4A, the base image B1 indicating that the point information is included in the QR code is included in the QR code in superimposed manner, and a QR code Q1 which includes the base image B1 in superimposed manner is generated. Since the base image B1 is included in the QR code Q1 in superimposed manner, the user who views the QR code Q1 can visually grasp that point information is provided by the QR code Q1.

Figure 4B:
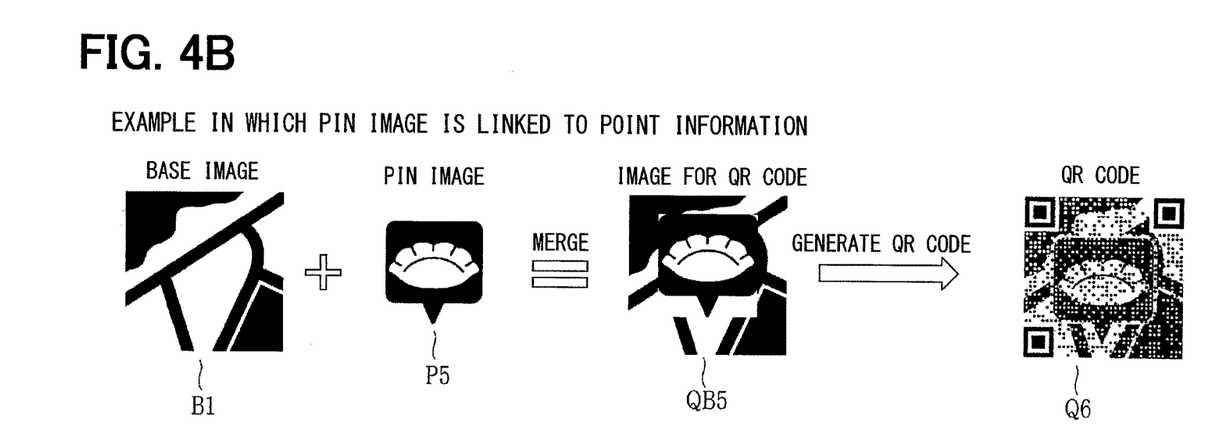
FIG. 4B is a diagram illustrating an example of the QR code on which a pin image linked to the point information is superimposed.

On the other hand, when the QR code generation device 1 determines that the pin image linked to the point information exists as illustrated in FIG. 2 (S10: YES), the QR code generation device 1 acquires the corresponding pin image (S11), and merges the base image and the pin image together (S12). As a result, as illustrated in FIG. 4B, the base image B1 acquired in step S3 is merged with (superimposed on) a pin image P5 acquired in step S11 to generate an image QB5 for QR code. That is, the QR code generation device 1 generates the image QB5 for QR code (S8). The process in step S11 corresponds to an image acquisition process, and the process in step S12 corresponds to a QR code generation process.

Since the base image B1 and the pin image are included in the QR code Q5 in superimposed manner as described above, the user who views the QR code Q5 can visually obtain that the point information is provided by the QR code Q1, and can visually obtain further information indicating that dumplings are a specialty of that point.

When determining that the POI information is included in the coding information in step S4 (S4: YES), the QR code generation device 1 further determines whether pin image linked to the POI information exists or not (S5). In this situation, when determining that pin image linked to the POI information does not exist (S5: NO), the process proceeds to step S8, and generates the image for QR code which is a base for generating the QR code (S8) with the use of the base image acquired in step S3. Then, the QR code generation device generates the QR which includes the base image in superimposed manner (S9).

When determining that the pin image linked to the POI information exists as illustrated in FIG. 2 (S5: YES), the QR code generation device 1 acquires the corresponding pin image (S6). In this situation, for example, when the POI name indicative of an eating place such as YY restaurant is included in the POI information, the QR code generation device 1 acquires the pin image that visually indicates the eating place or reminds the user to think of the eating place, such as the pin image P1 in FIG. 2.

Figure 5A:
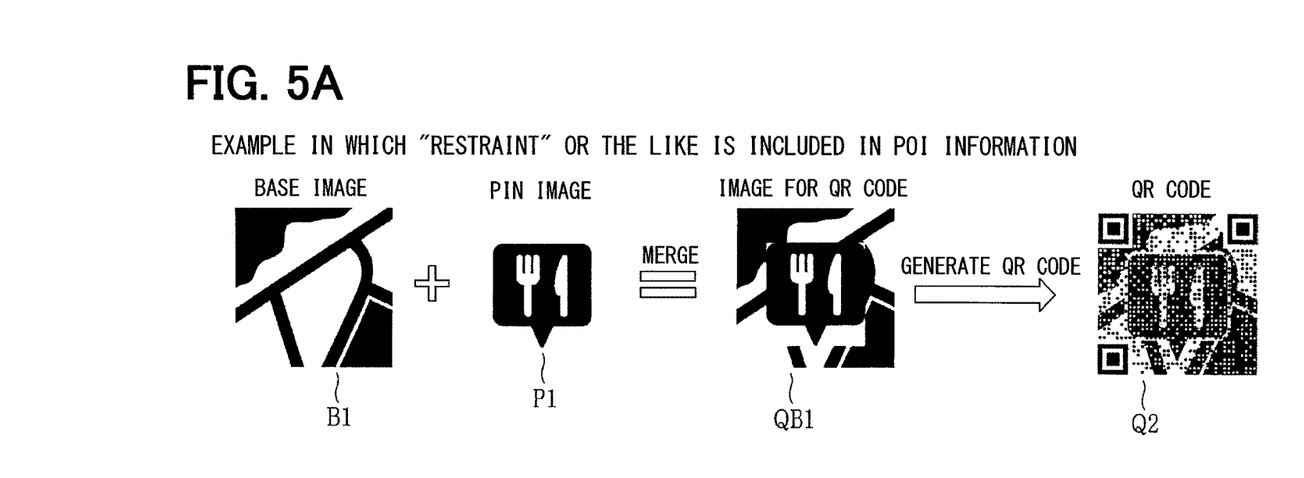
FIG. 5A is a diagram illustrating an example of the QR code on which a pin image linked to a POI name is superimposed.

Upon acquiring the image, the QR code generation device 1 merges the base image and the pin image together (S7), and generates the image for QR code (S8). As a result, as illustrated in FIG. 5A, an image QB1 for QR code in which the base image B1 and the pin image P1 are merged together is generated. Then, the QR code generation device 1 generates the QR code (S9). As a result, as illustrated in FIG. 5A, the QR code Q2 in which the base image B1 and the pin image P1 are included in superimposed manner is generated. As a result, the user can visually grasp that the point information is included in the QR code Q2, and can further grasp that the POI included in the QR code is an eating place.

Figure 5B:
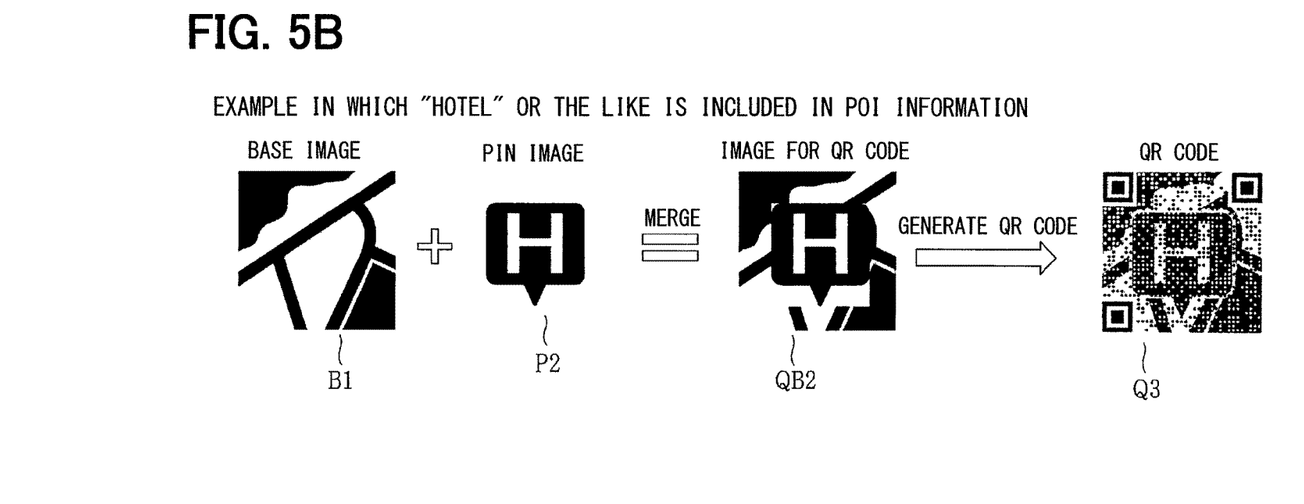
FIG. 5B is a diagram illustrating an example of the QR code on which another pin image linked to another POI name is superimposed.

When the POI name indicative of an accommodation such as a hotel is included in the POI information, the QR code generation device 1 acquires the pin image P2 indicative of the accommodation in the above step S5, and merges the base image B1 and the pin image P2 together to generate an image QB2 for QR code. As illustrated in FIG. 5B, the QR code generation device 1 generates a QR code Q3 in which the base image B1 and the pin image P2 are included in superimposed manner. As a result, the user can grasp that the POI included in the QR code is indicative of an accommodation.

The POI information may include information other than the POI name. For example, when event information is provided, a time at which the event is held may be provided by the QR code. In this case, for example, when some events are conducted during daytime and some events are conducted during night-time, multiple QR codes may be published on a magazine such as an information magazine. In this situation, the user can visually grasp which QR code corresponds to a desired event, and there is no need to purposely read other QR codes. Thus, an improvement in user's convenience is considerable. Further, an additional display space for the QR code becomes unnecessary.

Figure 6A:
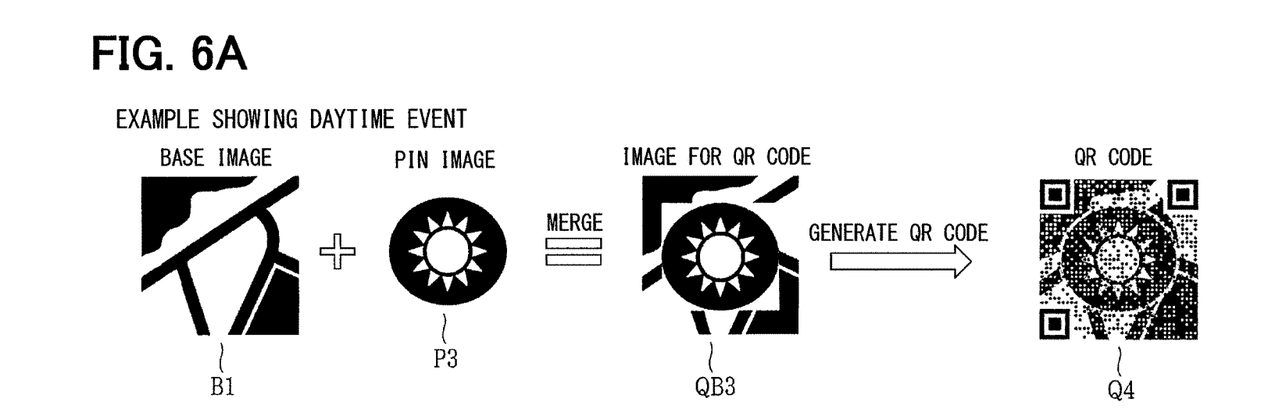
FIG. 6A is a diagram illustrating an example of the QR code on which a pin image linked to a time indicative of daytime is superimposed.
Figure 6B:
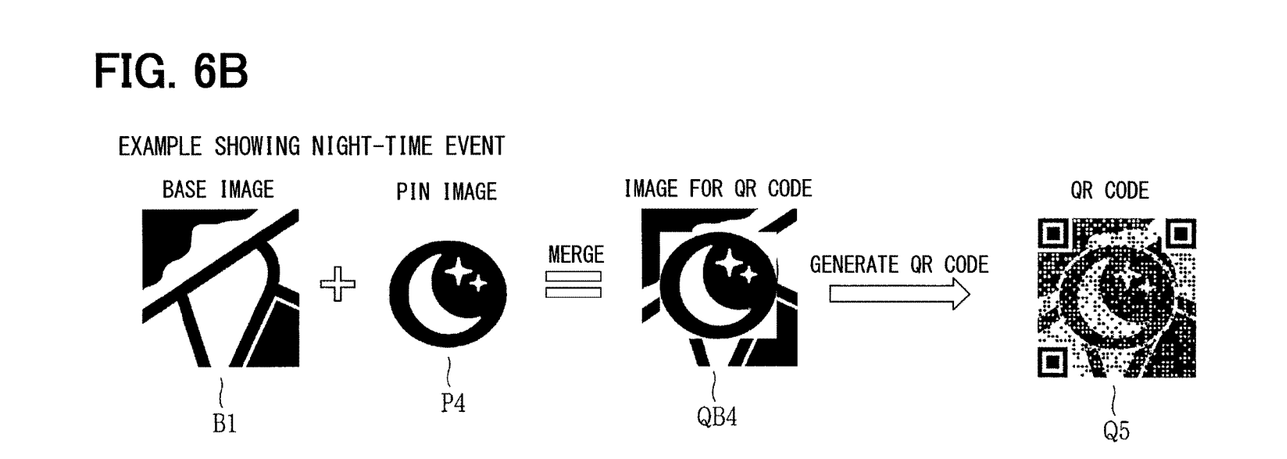
FIG. 6B is a diagram illustrating an example of the QR code on which a pin image linked to a time indicative of night-time is superimposed.

For the above-described reason, when the time can be identified on the basis of the time information included in the POI information, the QR code generation device 1 may acquire the pin image P3 linked to daytime as the pin image as illustrated in FIG. 6A, and generate a QR code Q4 with the use of an image QB3 for QR code in which the base image B1 and the pin image P3 are merged together. Alternatively, as illustrated in FIG. 6B, the QR code generation device 1 may acquire a pin image P4 linked to night-time as the pin image, and generate a QR code Q5 with the use of an image QB4 for QR code in which the base image B1 and the pin image P4 are merged together. By including the pin image linked to the point information or the POI information in the QR code in superimposed manner, more specifically, by changing the image to be superimposed according to the point information or the POI information, further additional information can be provided in addition to the point information.

As described above, the QR code generation device 1 acquires the image on the basis of the point information or the POI information included in the coding information, and generates the QR code in which the acquired image is included in superimposed manner.

The foregoing embodiment can provide the following advantages.

The QR code generation device selects and acquires the image on the basis of the point information included in the coding information. As a result, a person who creates the QR code has no need to generate the image each time, and can acquire a desired image in easy way. With the generation of the QR code in which the acquired image is included in superimposed manner, the user can visually grasp that the point information is provided by the QR code by merely viewing the QR code without reading the QR code.

Since the user can visually grasp the provision of point information, the user can predict that a route guidance, which activates a navigation application, may be enabled when the user reads the QR code. Thus, the QR code can induce the user to a service having an added value beyond mere information provision.

In addition, a display space for presenting a caption indicating that the point information is included in the QR code becomes unnecessary, and when a paper surface is limited as with magazines, the display space may not be restricted. Since a necessity that a creator of the QR code understands what information is provided is reduced, and there is no need to create a corresponding image, a work of generating the QR code can be easily performed.

The QR code generation device 1 selects and acquires, as the pin image, the image associated with the POI information from the multiple images registered in the image DB 14. Herein, the POI information is included in the coding information. Then, the QR code generation device 1 generates the QR code in which the base image and the pin image are included in superimposed manner. In other words, the QR code generation device 1 changes the image to be superimposed according to the point information or the POI information. As a result, the QR code generation device 1 can indicate further additional information in addition to the point information, and can visually provide the multiple kinds of information by a single QR code.

The QR code generation device 1 selects and acquires, based on the POI name in the POI information, the image that visually indicates the genre to which the POI name belongs as the pin image, and generates the QR code in which the acquired image is included in superimposed manner. As a result, the information indicating the type of the POI such as a restaurant or a hotel can be provided without using additional display space.

The QR code generation device 1 selects and acquires, based on the time information included in the POI information, the image that visually indicates the time identified by the time information as the pin image, and generates the QR code in which the acquired image is included in superimposed manner. As a result, for example, whether the event is conducted during daytime or night-time can be provided without using additional display space.

The QR code generation device 1 selects and acquires the image, which is associated with the point information and visually indicates the point information, as the pin image, and generates the QR code in which the acquired image is included in superimposed manner. As a result, for example, information on specialties and local products around the POI can be provided without using additional display space.

In addition, the advantages of the above-described QR code generation device 1 can be obtained by a QR code generation program (QR code generating process) including: a determination process that determines whether point information is included in coding information for generating a QR code (registered trademark); an image acquisition process that selects an image that visually indicate the point information from an image DB 14 in which multiple images are registered, and acquires the selected image as a base image when it is determined by the determination process that the point information is included in the coding information; and a QR code generation process that generates the QR code on the basis of the coding information while generating the QR code on which the base image is superimposed when the base image is acquired by the image acquisition process. The QR code generation program can be provided as a program product stored in a non-transitory tangible computer readable storage medium.

The image acquisition process selects the image associated with the POI information included in the coding information from the multiple images registered in the image DB 14, acquires the selected image as the pin image, and the QR code generation process generates the QR code in which the base image and the pin image are included in superimposed manner. With the above processes, the advantages of the QR code generation device 1 described above can be obtained.

It is noted that a flowchart or the processing of the flowchart in the present disclosure includes units (also referred to as steps), each of which is represented, for instance, as S1. Further, each unit can be divided into several sub-units while several units can be combined into a single unit. Furthermore, each of thus configured units can be also referred to as a circuit, device, module, or means.

Each or any combination of units explained in the above can be achieved as (i) a software unit in combination with a hardware unit (e.g., computer) or (ii) a hardware unit, including or not including a function of a related apparatus; furthermore, the hardware unit (e.g., integrated circuit, hardwired logic circuit) may be constructed inside of a microcomputer.

(Other Embodiments)

The present disclosure is not limited to the exemplifications of the above embodiment, but can be arbitrarily modified and expanded without departing from the scope of the exemplifications.

In the foregoing embodiment, the QR code generation device 1 is configured by a single personal computer. Alternatively, the determination unit 15, the image acquisition unit 16, and the code generation unit 17 may be configured by multiple personal computers. The coding information may be inputted to the QR code generation device 1 by a personal computer or a smartphone of the creator.

Further, a QR code generation system may be provided. In this QR code generation system, the image DB 14 is installed in a server on a network. The coding information, the point information, or the POI information extracted from the coding information is transmitted from the QR code generation device 1 to the image DB 14. An image selected in the image DB 14 is acquired by the system. In this case, the image DB 14 may be shared by unspecified number of creators. For example, even when the base image B1 is an image indicative of the point information, unless this fact is not widely known, it may be misunderstood that the base image B1 is a simple design. Under this circumstances, the image DB 14 is shared by a large number of creators with the result that the base image B1 is employed as the image indicative of the point information in a large number of QR codes, and it can be generally well known that the base image B1 is the image indicative of the point information. The same is applied to the pin image.

In the foregoing embodiment, the genre is determined on the basis of the POI name. Alternatively, the genre may be configured to be settable.

The foregoing embodiment shows an example in which one of the pin image linked to the POI information or the pin image linked to the point information is superimposed on the QR code. Alternatively, the QR code on which both of those pin images are superimposed may be generated. When both of those pin images are superimposed on the QR code, types and sizes of the pin images may be set different from the case in which only one pin image is superimposed.

In the foregoing embodiment, the POI information is prioritized when acquiring the pin image. Alternatively, the point information may be prioritized when acquiring the pin image. When the POI name and the time information are included in the POI information, any information may be prioritized, that is, acquisition of the pin image on the basis of any information may be settable. For example, in the case of the event, it is conceivable to prioritize the event holding time over the POI name (in other words, name of an event venue). In other words, information to be conceivably provided by the creator in the information included in the coding information can be prioritized to further improve the user's convenience.

Multiple images may be selected on the basis of the time information. For example, it is conceivable to change the pin image acquired by the season such as cherry in spring and autumn leaves in autumn.

Multiple images to be linked to the point information may be prepared, and the image may be changed according to the coding information. For example, it is conceivable that an image associated with a route map for guidance of trains is prepared as an option other than the image associated with the roads as in the base image B1.

In the foregoing embodiment, dumplings are exemplified as the area related pin image, but the present disclosure is not limited to this configuration. It is conceivable that, for example, if the specialty of the area is wheat noodles, a pin image of the wheat noodles may be used, and if the area is close to Mount Fuji, a pin image of Mount Fuji may be used.

No use of the pin image may be settable, and the pin image may be changeable to another pin image. For example, if the pin image of the wheat noodles is superimposed on the QR code of a ramen shop because the specialty of a prefecture is the wheat noodles, a user who view the QR code may feel uncomfortable feeling. In particular, when the contents of the QR code can be visually grasped without reading the QR code as in the present disclosure, there is a possibility to cause misunderstanding. For that reason, setting may be conducted without using wheat noodles, or a substitute image may be provided.

The pin image to be used may be changed according to the size of the QR code. For example, in the case of the QR code having a display size of about 10 mm×10 mm in a recommended set value of the QR code, the resolution of the image is considered to be deteriorated. Therefore, it is conceivable to make the image simpler. Alternatively, the image may be changed according to not the recommended set value of the QR code, but a size of a paper surface or a website on which the QR code is actually displayed.

In the foregoing embodiment, the device and the program product for generating the QR code (ISO/IEC18004) which is one type of the two-dimensional code have been described. Alternatively, the present disclosure may be applied to a device and a program product for generating other two-dimensional codes.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A two-dimensional code generation device comprising:
a determination unit determining whether point information is included in coding information, wherein the coding information is information for generating a two-dimensional code and the point information identifies at least one of a geographic location and a geographic area;
an image acquisition unit selecting, from an image database, an image that visually indicates the point information and acquires the image that is selected as a base image when the determination unit determines that the point information is included in the coding information, wherein a plurality of images are preliminarily registered in the image database; and
a code generation unit generating the two-dimensional code based on the coding information, wherein the code generation unit includes the base image in the two-dimensional code in a superimposed manner when the base image is acquired by the image acquisition unit;
wherein:
the determination unit further determines whether point of interest (POI) information is included in the coding information,
the image acquisition unit selects an image associated with the point of interest (POI) information from the plurality of images registered in the image database and acquires the image that is selected as a pin image when the determination unit determines that the POI information is included in the coding information, and
the code generation unit includes the base image and the pin image in the two-dimensional code in a superimposed manner when generating the two-dimensional code.

2. The two-dimensional code generation device according to claim 1, wherein
the image acquisition unit selects an image, which is associated with a POI name included in the POI information and visually indicates a genre of the POI name, and acquires the image that is selected as the pin image.

3. The two-dimensional code generation device according to claim 1, wherein
the image acquisition unit selects an image, which is associated with time information included in the POI information and visually indicates a time identified by the time information, and acquires the image that is selected as the pin image.

4. The two-dimensional code generation device according to claim 1, wherein
the image acquisition unit selects an image, which is associated with the point information and visually indicates the point information, and acquires the image that is selected as the pin image.

5. The two-dimensional code generation device according to claim 1, wherein
the two-dimensional code is a QR code (registered trademark).

6. The two-dimensional code generation device according to claim 1, wherein the point information includes at least one of a latitude and longitude, an address, a zip code, a telephone number, and a mesh code.

7. A two-dimensional code generation program product stored in a non-transitory tangible computer readable storage medium, the two-dimensional code generation program product comprising instructions to be executed by a computer included in a controller of a two-dimensional code generation device, the instructions for implementing:
determining whether point information is included in coding information, wherein the coding information is information for generating a two-dimensional code and the point information identifies at least one of a geographic location and a geographic area;
selecting, from an image database, an image that visually indicates the point information and acquiring the image that is selected as a base image when determining that the point information is included in the coding information, wherein a plurality of images are preliminarily registered in the image database;
generating the two-dimensional code in which the base image is included in a superimposed manner based on the coding information;
determining whether point of interest (POI) information is included in the coding information;
selecting, from the plurality of images registered in the image database, an image associated with the POI information and acquiring the image that is selected as a pin image when determining that the POI information is included in the coding information; and
generating the two-dimensional code in which the base image and the pin image are included in a superimposed manner.

8. The two-dimensional code generation program product according to claim 7, wherein
the two-dimensional code is a QR code (registered trademark).

9. The two-dimensional code generation program product according to claim 7, wherein the point information includes at least one of a latitude and longitude, an address, a zip code, a telephone number, and a mesh code.

* * * * *